United States Patent [19]

Takahashi et al.

[11] 3,758,576
[45] Sept. 11, 1973

[54] PROCESS FOR THE PREPARATION OF N,N-DIALKYLAMIDES

[75] Inventors: Yasunobu Takahashi; Yohei Fukuoka, both of Tokyo, Japan

[73] Assignee: Asahi Kasei Kogyo Kabushiki Kaisha, Osaka-City, Osaka-Prefecture, Japan

[22] Filed: June 15, 1970

[21] Appl. No.: 48,877

Related U.S. Application Data

[63] Continuation of Ser. No. 735,591, June 10, 1968, abandoned.

[30] Foreign Application Priority Data

June 16, 1967 Japan.................................. 42/38230
Aug. 15, 1967 Japan.................................. 42/52081
Aug. 15, 1967 Japan.................................. 42/52082
Nov. 16, 1967 Japan.................................. 42/73364

[52] U.S. Cl............................................. 260/561 R
[51] Int. Cl............................................. C07c 103/08

[56] References Cited
OTHER PUBLICATIONS de Benneville et al.–J. Org. Chem. 21, 1072–5 (1956).

*Primary Examiner*—Alex Mazel
*Assistant Examiner*—R. V. Rush
*Attorney*—Woodhams, Blanchard & Flynn

[57] ABSTRACT

N,N-dialkyl carboxylic acid amides are prepared by reacting a primary amine, second amine or tertiary amine, or a mixture thereof, with a nitrile at elevated temperatures and pressures, with or without the use of a catalyst.

6 Claims, No Drawings

PROCESS FOR THE PREPARATION OF N,N-DIALKYLAMIDES

This invention relates to a process for the preparation of N,N-dialkylamides and more particularly to a process for the preparation of N,N-dialkylamides which comprises reacting a nitrile with one or more of a primary amine, a secondary amine and a tertiary amine in the presence of water with or without employing catalyst.

N,N-Dialkylamides including, for example N,N-dimethyl-acetamide, N,N-dimethylformamide, N,N-diethylformamide, etc. are commercially very important compounds which are useful as solvents for various purposes, such as extraction, reaction, etc. Despite such usefulness, N,N-dialkylamides have heretofore been scarcely used because of high cost of production thereof by the conventional methods.

In the convention production of N,N-dialkylamides there have been used as starting materials combinations of a dialkylamine with several compounds; for example, an ester of a fatty acid with a dialkylamine, a fatty acid with a dialkylamine, a primary amide of a fatty acid with a dialkylamine, and a ketene with a dialkylamine. Besides, it has been is known that N,N-dialkylamides can be prepared by employing as a material a nitrile which is readily available as industrial material. The method involves hydrolysis of a nitrile in the presence of acid or alkali of an amount approximately equivalent to or more than the amount of nitrile with formation of the corresponding primary amide and/or acid and subsequent reaction of the resultant with a dialkylamine, yielding the desired N,N-dialkylamides.

As is understood from the above, amines which can be used in the conventional methods are limited solely to dialkylamines in any of those methods. Dialkylamines are produced by the reaction of an alcohol and ammonia with dehydration. The production of dialkylamines according to such reaction is inevitably accompanied by the formation of monoalkylamines and trialkylamines. The respective boiling points of those amines are closely adjacent to one another, thus causing the separation and purification of those amines obtained in the form of a mixture thereof to be very difficult. Therefore, purified dialkylamines are very costly in comparison with mixtures of amines which are produced directly by the ordinary process. This is the principal reason why the use of such methods as mentioned above tends to be limited. This is also the same in case of the method employing a nitrile which is obtainable at low cost.

Therefore, the use of monoalkylamines and trialkylamines formed as by-products of the producing process of dialkylamines as well as mixtures of those amines as starting material amines for production of N,N-dialkylamides, is exceedingly advantageous.

According to the present invention, N,N-dialkylamides can be produced directly by a one-step process which, as quite distinct from the conventional processes, comprises reacting a nitrile which is readily available at a low cost with an alkylamine in the presence of water. It is, according to this process, possible to produce N,N-dialkylamides not only from the combination of a nitrile, a secondary amine and water but from the combination of a nitrile, a primary amide or a tertiary amine and water. It is also noted that the present process is effective for the use of mixtures of those primary, secondary and tertiary amines.

One of the commercial advantages of the process of the present invention is the availability of materials used in this process. For example, acetonitrile and the mixture of methylamines which is obtained by the synthesis reaction of ammonia and methanol can be employed in our process for production of N,N-dimethylamides. When prussic acid is used as a starting material in place of acrylonitrile in the above process, N,N-dimethylformamide is produced. The present invention thus provides a process for the production of N,N-dialkylamides which is industrially advantageous.

Nitriles which are employed in the process of this invention are represented by the general formula $R-CN$ wherein R is hydrogen or an alkyl group having 6 or less carbon atoms and include, for example prussic acid, acetonitrile, n-propionitrile, isopropionitrile, n-butyronitrile, isobutyronitrile, sec-butyronitrile, tert-butyronitrile, valeronitrile, capronitrile and the like. Amines employable in the present process are represented by the general formulae $R'-NH_2$, $(R')_2NH$ and $(R')_3N$ wherein R' is an alkyl group having four or less carbon atoms. Those primary amines, secondary amines and tertiary amines include, for example methylamine, dimethylamine, trimethylamine, ethylamine, diethylamine, triethylamine, n-propylamine, di-n-propylamine, tri-n-propylamine, isopropylamine, di-isopropylamine, tri-isopropylamine, n-butylamine, di-n-butylamine, tri-n-butylamine, isobutylamine, diisobutylamine, triisobutylamine, sec-butylamine, di-sec-butylamine, tri-sec-butylamine and the like.

According to the present invention, the above-mentioned nitriles and one or more of the primary amines, secondary amines and tertiary amines as indicated above are reacted in the presence of water without employing any catalyst to produce the desired N,N-dialkylamides with great advantage. Yet, it is noted that, since in carrying out the present process the use of a catalyst accelerates the reaction speed and controls the by-reaction to improve the yield, a catalyst can advantageously be employed. Such catalysts can be selected from substances in the following three groups and they can be employed alone or in combination:

1. Metals of the group consisting of copper, silver, gold, zinc, cadmium, mercury, titanium, zirconium, tin, lead, antimony, bismuth, chromium, molybdenum, tungsten, manganese, iron, cobalt, nickel, ruthenium, rhodium, osmium, palladium, iridium and platinum; and oxides, sulfides, oxyhalides, hydroxides, inorganic acid salts and organic acid salts thereof:
2. Chromic acid, dichromic acid, molybdic acid, tungstic acid and permanganic acid; alkali metal salts thereof and (1)-indicated metal salts thereof: and
(3) Peroxides.

The inorganic acid salts in group (1) include salts of nitric acid, sulfuric acid, carbonic acid, hydrogen halides, phosphoric acid, boric acid, nitrous acid, sulfurous acid, phosphorous acid, pyrophosphoric acid, prussic acid, thiocyanic acid and the like, and the organic acid salts in the same group include salts of formic acid, acetic acid, propionic acid, butyric acid, stearic acid, oxalic acid, citric acid, p-toluene-sulfonic acid, picric acid, naphthenic acid and the like. The peroxides of group (3) include ozone, peroxides, organic hydroperoxides, organic peracids, inorganic peracids and the like; for example, benzoyl peroxide, peracetic acid, hydrogen peroxide, potassium persulfuric acid, tert-butylhydroperoxide, etc. There may also be employed other compounds as far as they are capable of forming those peroxides during the reaction. Such compounds are, for example barium peroxide, sodium peroxide and the like.

Of the above-mentioned catalysts, the halides of copper, zinc, cadmium, tin, lead, antimony, bismuth, chromium, manganese, iron, cobalt, nickel or palladium exhibit the most preferable effect. The catalyst may be applied in the state of solution or suspension in the reaction medium. The catalyst may be present in an amount ranging from 0.0001 to 10 mole percent; more preferably from 0.01 to 5 mole percent, based on the amount of nitrile employed. Even with the use of an excessive amount of catalyst, the increase in the effect is not so much appreciable, but rather the detrimental influence is seriously observed with regard to the isolation and purification of the desired products. THe reaction temperature to be employed may be in the range from from 100° to 450°C preferably 180° to 360°C, because the lower the temperature, the slower the reaction speed is, while at a too high temperature the by-reaction is promoted, leading to the less yield of the desired N,N-dialkylamides. In carrying out the process of this invention, the starting materials including a nitrile, one or more amines and water each can be present in a full amount required for the reaction at a time of initiation of the reaction, or can be step-wise added with the progress of the reaction. One or more amines can be employed in an amount approximately equivalent to or more than the amount of nitrile. Water can be employed in an amount of 0.7 to 10 equivalents, based on the amount of nitrile. When the amount of water is insufficient, some of amine remains unreacted. It is also not preferable to employ too much amount of amine because an increasing amount of amine tends to promote the formation of a primary amide and a fatty acid as by-products. Therefore, more preferable is the range from 0.9 to 1.5 equivalents of amine in relation to the amount of nitrile.

The products obtained according to the present process generally includes the primary amides, the secondary amides and a little amount of the fatty acids as by-products. Yet, by addition of those by-products to an initial reaction system the yeild of the N,N-dialkylamides in relation to the amount of nitriles employed can be advantageously increased. It is also to be noted that by virtue of the significant difference in boiling points of the primary amides, the secondary amides and the tertiary amides those amides are readily separable from the mixtures thereof in contrast to the difficulty of separation in case of the mixtures of alkylamines. For these reasons, by recycling the above-mentioned by-procucts to the reaction system, the desired N,N-dialkylamides can be produced in high yield.

If sole dialkylamines are employed as amines in carrying out the present process, the formation of the primary amides and the secondary amides are suppressed to produce the desired N,N-dialkylamides in high yield as long as a relatively low temperature, i.e. 100° to 350°C. is employed. In this case, particularly peroxides are effective as catalysts.

EXAMPLE 1

27.5 g. of propionitrile, 40.2 g. of diethylamine and 9.0 g. of water were charged into an induction revolution stirring type autoclave (hereinafter referred to as autoclave) having a capacity of 200 ml., and were, after replacement of the atmosphere by nitrogen, heated at 340°C. for 24 hours. On opening the autoclave the unreacted propionitrile and diethylamine were recovered from the products under the normal pressure. Whereupon, the residue was distilled under reduced pressure to yield 11.2 g. of N,N-diethylpropionamide as a fraction boiling at 71°C./9mmHg in a yield of 17.5 percent.

Elementary analysis:

|     | Found | Calcd. |
| --- | --- | --- |
| C % | 65.34 | 65.07 |
| H % | 11.41 | 11.70 |
| N % | 10.79 | 10.84 |

EXAMPLE 2

An autoclave of 200 ml. capacity was charged with 27 g. of prussic acid, 90 g. of dimethylamine and 18 g. of water, which, after replacement of the atmosphere by nitrogen, were heated at 280°C. for 48 hours. On opening the autoclave the portions having lower boiling points were removed under the normal pressure. The remaining portion was distilled to yield 2.0 g. of N,N-dimethylformamide boiling at 152°–153°C. Its infrared absorption spectrum exhibited an absorption due to the amide group at $\nu$ max, 1640 cm$^{-1}$.

Elementary analysis:

|     | Found | Calcd. |
| --- | --- | --- |
| C % | 40.15 | 40.30 |
| H % | 9.80 | 9.65 |
| N % | 19.02 | 19.17 |

EXAMPLE 3

To an autoclave of 300 ml. capacity were charged 41 g. of acetonitrile, 89 g. of trimethylamine and 19 g. of water, which, after replacement of the atmosphere by nitrogen, were heated with stirring at 360°C. for 168 hours. On opening, the portions having lower boiling points were removed under the normal pressure. The subsequent distillation yielded 6.1 g. of N,N-dimethylacetamide.

EXAMPLE 4

An autoclave of 300 ml. capacity was charged with 41 g. of acetonitrile, 3 g. of methylamine, 27 g. of dimethylamine, 18 g. of trimethylamine and 19 g. of water, which, after replacement of the atmosphere by nitrogen, were heated with stirring at 360°C. for 48 hours. On opening the autoclave the portions boiling at lower temperature were removed under the atmospheric pressure. Subsequently, the residue were subjected to distillation to give N,N-dimethylacetamide in a yield of 17.4 g.

EXAMPLE 5

To 27.5 g. of propionitrile, 40.2 g. of diethylamine and 9.0 g. of water were added 0.85 g. of cupric chloride as catalyst. After replacement of the atmosphere with nitrogen the stirred mixture were heated to react at 320°C. for 24 hours to give N,N-diethylpropionamide in a yield of 14.8 percent.

Elementary analysis:

|     | Found | Calcd. |
|-----|-------|--------|
| C % | 62.47 | 62.57  |
| H % | 11.49 | 11.38  |
| N % | 12.22 | 12.16  |

EXAMPLE 6

To series of the mixtures of 2.75 g. of propionitrile, 4.02 g. of diethylamine and 0.9 g. of water was added each of the catalysts shown in Table 1 in an amount of 0.5 mole percent based on the amount of propionitrile. The mixtures each were reacted by heating at 280°C. for 4 hours, resulting in N,N-diethylpropionamide with the yields as given in the same Table.

TABLE 1

| Catalyst | Yield |
|----------|-------|
| Zinc acetate | 60.5 % |
| Silver nitrate | 23.2 % |
| Cadmium acetate | 58.5 % |
| Mercuric chloride | 65.1 % |
| Stannic chloride | 30.2 % |
| Stannous chloride | 31.5 % |
| Potassium permanganate | 38.2 % |
| Ferric chloride | 42.3 % |

EXAMPLE 7

To series of the mixtures of 20.5 g. of acetonitrile, 45 g. of dimethylamine and 9.0 g. of water was added each of the catalysts shown in Table 2 in an amount of 1.0 mole percent based on the amount of the acetonitrile, whereupon the mixtures were reacted each by heating at 200°C. for 24 hours, resulting in N,N-dimethylacetamide with the yields as shown in the same table.

TABLE 2

| Catalyst | Yield |
|----------|-------|
| Antimony chloride | 43.7 % |
| Manganese sulfate | 35.6 % |
| Cobalt chloride | 52.8 % |
| Lead sulfate | 40.1 % |
| Hydrogen peroxide | 85.5 % |
| Benzoyl peroxide | 82.5 % |
| Peracetic acid | 75.4 % |
| Zirconium oxychloride | 47.8 % |
| Zinc phosphite | 69.2 % |
| Lead sulfite | 35.1 % |
| Copper (powder) | 19.2 % |
| Zinc (powder) | 15.8 % |
| Molybdic acid | 32.5 % |
| Tungstic acid | 28.3 % |
| Basic cobalt carbonate | 31.2 % |
| Zinc stearate | 68.2 % |

EXAMPLE 8

An autoclave of 200 ml. capacity was charged with 27 g. of prussic acid, 90 g. of dimethylamine, 18 g. of water and 4.2 g. of zinc chloride, which were heated at 180°C. for 1 hour to yield 68 g. of N,N-dimethylformamide.

EXAMPLE 9

2.7 g. of prussic acid, 7.0 g. of dimethylamine and 1.9 g. of water were charged together with the catalyst into the autoclave of 20 ml. The reaction was allowed to proceed at 240°C. for two hours. The yields of N,N-dimethylformamide and the amounts of the catalysts are listed in Table 3 by catalysts added.

TABLE 3

| Catalyst | Amount of catalyst | Yield |
|----------|--------------------|-------|
| Cuprous cyanide | 0.09 g. | 2.5 g. |
| Silver nitrate | 0.15 g. | 2.1 g. |
| Chlorauric acid | 0.41 g. | 3.5 g. |
| Mercurous chloride | 0.24 g. | 3.1 g. |
| Mercury thiocyanate | 0.32 g. | 3.5 g. |
| Stannous oxalate | 0.21 g. | 4.0 g. |
| Lead p-toluene-sulfonate | 0.17 g. | 2.0 g. |
| Antimony tribromide | 0.36 g. | 4.0 g. |
| Bismuth oxychloride | 0.32 g. | 2.1 g. |
| Chromium sulfate | 0.39 g. | 2.4 g. |
| Potassium permanganate | 0.16 g. | 1.8 g. |
| Ferrous chloride | 0.13 g. | 4.2 g. |
| Cobalt naphthenate | 0.60 g. | 3.9 g. |
| Nickel bromide | 0.27 g. | 2.8 g. |
| Ruthenium chloride | 0.21 g. | 2.7 g. |
| Rhodium chloride | 0.26 g. | 2.9 g. |
| Palladium chloride | 0.18 g. | 3.2 g. |
| Peracetic acid | 0.08 g. | 2.0 g. |
| Hydrogen peroxide | 0.04 g. | 3.2 g. |
| Potassium persulfate | 0.27 g. | 1.9 g. |
| Manganese chloride | 0.10 g. | 4.2 g. |
| and Cobalt chloride | 0.12 g. | |

EXAMPLE 10

To series of the mixtures of 4.1 g. of acetonitrile, 12.0 g. of trimethylamine and 1.9 g. of water was added the catalyst, whereupon the mixtures each were heated at 360°C. for eight hours to yield N,N-dimethylacetamide. The results are shown in Table 4.

TABLE 4

| Catalyst | Amount of catalyst | Yield |
|----------|--------------------|-------|
| Zinc oxide | 0.2 g. | 4.2 g. |
| Silver nitrate | 0.5 g. | 1.3 g. |
| Cadmium phosphate | 0.2 g. | 4.8 g. |
| Mercuric sulfate | 0.8 g. | 2.2 g. |
| Mercurous chloride | 0.3 g. | 2.1 g. |
| Zinc naphthenate | 0.2 g. | 6.0 g. |
| Cuprous bromide | 0.2 g. | 5.4 g. |

EXAMPLE 11

To series of the mixtures of 4.1 g. of acetonitrile, 4.0 g. of methylamine and 1.9 g. of water was added the catalyst in an amount of 2 mole percent based on the amount of acetonitrile, whereupon the mixtures each were heated at 360°C. for 3 hours to yield N,N-dimethylacetamide. The results are given in Table 5.

TABLE 5

| Catalyst | Yield |
|----------|-------|
| Zinc sulfide | 2.8 g. |
| Cupric formate | 1.5 g. |
| Cupric n-butyrate | 1.8 g. |
| Cupric tungstate and Zinc citrate | 2.0 g. |
| Peracetic acid and Cupric borate | 1.5 g. |
| Basic Cupric chromate and Zinc picrate | 1.8 g. |

EXAMPLE 12

To series of the mixtures of 2.7 g. of prussic acid, 4.0 g. of methylamine and 1.9 g. of water was added the catalyst in an amount of 2 mole percent based on the amount of prussic acid. The mixtures each were heated to react at 240°C. for three hours, giving N,N-dimethylformamide. The results are shown in Table 6.

TABLE 6

| Catalyst | Yield |
|----------|-------|
| Ferric bromide | 1.1 g. |
| Palladium chloride | 1.3 g. |
| Osmium tetrachloride | 0.5 g. |
| Zirconium oxychloride | 0.8 g. |
| Platinum chloride | 1.4 g. |

EXAMPLE 13

The mixture of 41 g. of acetonitrile, 63 g. of dimethylamine, 35.5 g. of trimethylamine, 19 g. of water and 4.8 g. of bismuth nitrate was heated at 290°C. for two hours, resulting in 70 g. of N,N-dimethylacetamide.

EXAMPLE 14

To series of the mixtures of 4.1 g. of acetonitrile, 0.46 g. of monomethylamine, 5.4 g. of dimethylamine, 0.89 g. of trimethylamine and 1.9 g. of water was added the catalyst in amount of 1 mole percent based on the amount of acetonitrile. The reactions were allowed to proceed at 280°C. for four hours, giving N,N-dimethylacetamide. Table 7 shows the results.

TABLE 7

| Catalyst | Yield |
| --- | --- |
| Mercuric chloride | 6.9 g. |
| Ferric nitrate | 5.3 g. |
| Manganese sulfate | 5.0 g. |
| Zinc hydroxide | 6.2 g. |
| Nickel acetate | 5.1 g. |
| Benzoyl peroxide | 7.0 g. |
| Peracetic acid | 4.0 g. |
| Cobalt chloride | 4.5 g. |

EXAMPLE 15

To series of the mixtures of 4.1 g. of acetonitrile, 2.5 g. of dimethylamine, 3.0 g. of trimethylamine and 1.9 g. of water was added the catalyst in an amount of 5 mole percent based on the amount of acetonitrile. The reactions were allowed to proceed at 320°C. for four hours to give N,N-dimethylacetamide with yields as shown in Table 8.

TABLE 8

| Catalyst | Yield |
| --- | --- |
| Cadmium acetate | 4.8 g. |
| Cupric chloride | 4.5 g. |
| Silver nitrate | 4.1 g. |
| Titanium trichloride | 2.8 g. |
| Lead nitrate | 3.4 g. |

EXAMPLE 16

41 g. of acetonitrile, 3 g. of monomethylamine, 32 g. of dimethylamine, 12 g. of trimethylamine, 19 g. of water and 1.3 g. of zinc chloride were allowed to react at 280°C. for four hours, resulting in 61 g. of N,N-dimethylacetamide. There was also given as a by-product 14.6 g. of N-methylacetamide having a boiling point of 140°C./90mmHg. Its infrared absorption spectrum exhibited an absorption due to amido group at $\nu$max, 1640 cm$^{-1}$. To N-methylacetamide thus obtained were added 0.6 g. of methylamine, 6.3 g. of dimethylamine, 2.4 g. of trimethylamine and 0.26 g. of zinc chloride, whereupon they were reacted at 280°C. for four hours, resulting in 11.3 g. of N,N-dimethylacetamide.

EXAMPLE 17

41 g. of acetonitrile, 23 g. of dimethylamine, 90 g. of trimethylamine, 20 g. of water and 3.0 g. of cupric chloride were allowed to react at 320°C. for three hours with the preparation of 52.1 g. of N,N-dimethylacetamide, accompanied by the formation of 21.9 of N-methylacetamide, 2.9 g. of acetamide and 3.0 g. of acetic acid as by-products.

It will be substantiated by the following that the by-products can be advantageously utilized by recycling them to the reaction system, thereby enabling the desired N,N-dialkylamides to be obtained in good yield.

The by-products thus obtained, i.e., 21.9 g. of N-methylacetamide, 2.9 g. of acetamide and 3.0 g. of acetic acid were charged together with 41 g. of acetonitrile, 23 g. of dimethylamine, 90 g. of trimethylamine, 20 g. of water and 3.0 g. of cupric chloride, whereupon the reaction was allowed to proceed at 320°C. for three hours, resulting in 74.1 g. of N,N-dimethylacetamide, 29.5 g. of N-methylacetamide, 3.9 g. of acetamide and 3.6 g. of acetic acid.

EXAMPLE 18

To the mixture of 4.1 g. of acetonitrile, 3.1 g. of methylamine, 9.0 g. of trimethylamine, 1.9 g. of water and 0.2 g. of cuprous chloride were added 3.2 g. of N-methylacetamide, 0.3 g. of acetamide and 0.3 g. of acetic acid. The reaction was allowed to proceed at 340°C. for two hours to yield 6.8 g. of N,N-dimethylacetamide.

EXAMPLE 19

2.7 g. of prussic acid, 0.2 g. of methylamine, 4.0 g. of dimethylamine, 4.0 g. of trimethylamine, 3.0 g. of N-methylformamide and 0.4 g. of cobalt chloride were admixed and heated to react at 260°C. for two hours, yielding 5.1 g. of N,N-dimethylformamide.

EXAMPLE 20

4.1 g. of acetonitrile, 5.9 g. of di-n-butylamine, 8.3 g. of tri-n-butylamine, 2.2 g. of water and 0.5 g. of zinc acetate were admixed and heated to react at 360°C. for eight hours, giving N,N-di-n-butylacetamide in a yield of 4.8 g. N,N-di-n-butylacetamide boiled at 115° – 116°C./9mmHg and its infrared absorption spectrum exhibited an absorption due to amido group at $\nu$max, 1640 cm$^{-1}$.

What is claimed is:

1. A process for the preparation of N,N-dialkylamides which comprises reacting (A) a nitrile represented by the general formula R—CN wherein R is a member selected from the group consisting of hydrogen and an alkyl radical having 1 to 6 carbon atoms, with (B) an amine selected from the group consisting of a primary amine, a secondary amine and a tertiary amine and mixtures thereof respectively represented by the general formulae R'—NH$_2$, (R')$_2$NH and (R')$_3$N wherein R' is an alkyl radical having one to four carbon atoms, in a sealed reaction vessel under autogenous pressure and at temperatures in the range of about 100° to 450°C., in the presence of from 0.7 to 10 equivalents of water, based on the amount of nitrile and in the presence of a catalyst comprising a substance selected from the groups of (1) metals of the group consisting of copper, silver, gold, zinc, cadmium, mercury, titanium, zirconium, tin, lead, antimony, bismuth, chromium, molybdenum, tungsten, manganese, iron, cobalt, nickel, ruthenium, rhodium, osmium, palladium, iridium and platinum; and oxides, sulfides, oxyhalides, hydroxides, inorganic acid salts and organic acid salts thereof, said inorganic acid being selected from the group consisting of nitric acid, sulfuric acid, carbonic acid, hydrogen halides, phosphoric acid, boric acid, nitrous acid, sulfurous acid, phosphorous acid, pyrophosphoric acid, prussic acid and thiocyanic acid, said organic acid being selected from the group consisting of formic acid, acetic acid, propionic acid, butyric acid, stearic acid, oxalic acid, citric acid, p-toluene-sulfonic acid, picric acid and naphthenic acid, (2) molybdic acid, tungstic acid, potassium permanganate, cupric tungstate and basic cupric chromate, and (3) peroxides of the group consisting of benzoyl peroxide, hydrogen peroxide, tert-butyl-hydroperoxide, peracetic acid, and potassium persulfate.

2. A process as claimed in claim 1, wherein the catalyst comprises a halide of the group of copper, zinc, cadmium, tin, lead, antimony, bismuth, chromium, manganese, iron, cobalt, nickel and palladium.

3. A process as claimed in claim 1, wherein the reaction is effected employing a secondary amine at 180° to 350°C. in the presence of a peroxide selected from the group consisting of benzoyl peroxide, hydrogen peroxide and tert-butylhydroperoxide.

4. A process as claimed in claim 1, wherein catalyst is present in an amount of 0.0001 to 10 mole percent, based on the amount of nitrile.

5. A process as claimed in claim 1, wherein primary amides, secondary amides and fatty acids which are produced are recycled.

6. A process for the preparation of N,N-dialkylamides which comprises reacting (A) a nitrile represented by the general formula R—CN wherein R is a member selected from the group consisting of hydrogen and an alkyl radical having 1 to 6 carbon atoms, with (B) an amine selected from the group consisting of a primary amine, a secondary amine and a tertiary amine and mixtures thereof respectively represented by the general formulae $R'—NH_2$, $(R')_2NH$ and $(R')_3N$ wherein R' is an alkyl radical having one to four carbon atoms, in a sealed reaction vessel under autogenous pressure and at temperatures in the range of about 100° to 450°C., in the presence of from 0.7 to 10 equivalents of water, based on the amount of nitrile and a catalyst comprising a substance selected from the groups of (1) metals of the group consisting of copper and zinc; (2) oxides, sulfides, oxyhalides, hydroxides, inorganic acid salts and organic acid salts of metals selected from the group consisting of copper, silver, gold, zinc, cadmium, mercury, titanium, zirconium, tin, lead, antimony, bismuth, chromium, molybdenum, tungsten, manganese, iron, cobalt, nickel, ruthenium, rhodium, osmium, palladium, iridium and platinum, said inorganic acid being selected from the group consisting of nitric acid, sulfuric acid, carbonic acid, hydrogen halides, phosphoric acid, boric acid, nitrous acid, sulfurous acid, phosphorous acid, pyrophosphoric acid, prussic acid and thiocyanic acid, said organic acid being selected from the group consisting of formic acid, acetic acid, propionic acid, butyric acid, stearic acid, oxalic acid, citric acid, p-toluene-sulfonic acid, picric acid and naphthenic acid, (3) molybdic acid, tungstic acid, potassium permanganate, cupric tungstate and basic cupric chromate, and (4) peroxides of the group consisting of, benzoyl peroxide, hydrogen peroxide, tert-butyl-hydroperoxide, peracetic acid, and potassium persulfate.

* * * * *